May 3, 1966  D. M. SPEROS ETAL  3,249,859
METHOD AND APPARATUS FOR MEASURING THE STARTING
CHARACTERISTICS OF GAS FILLED DISCHARGE LAMPS
Filed Sept. 25, 1961  3 Sheets-Sheet 1
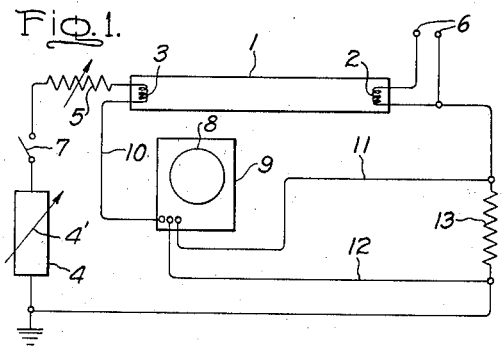
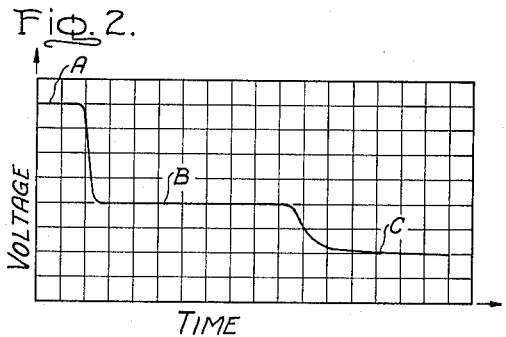
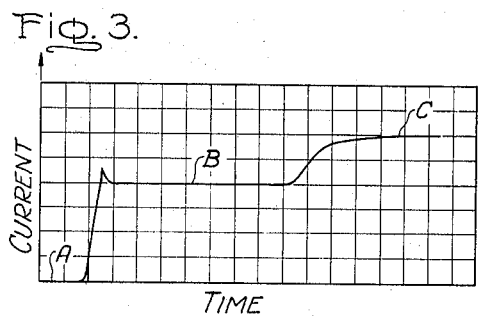
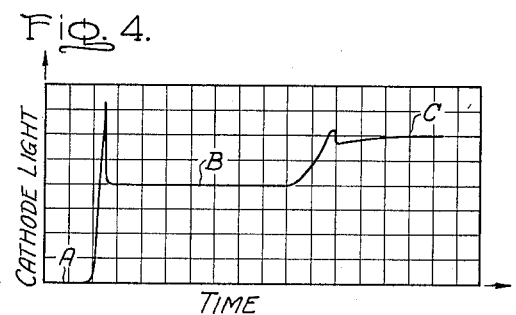
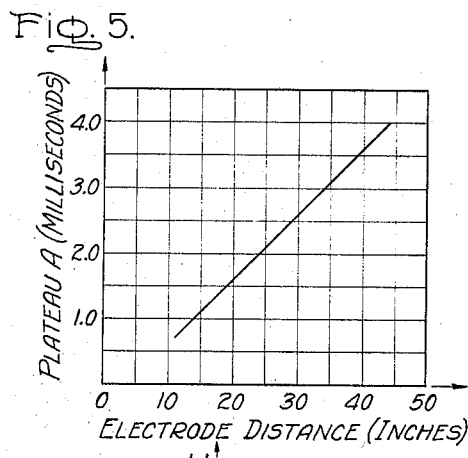
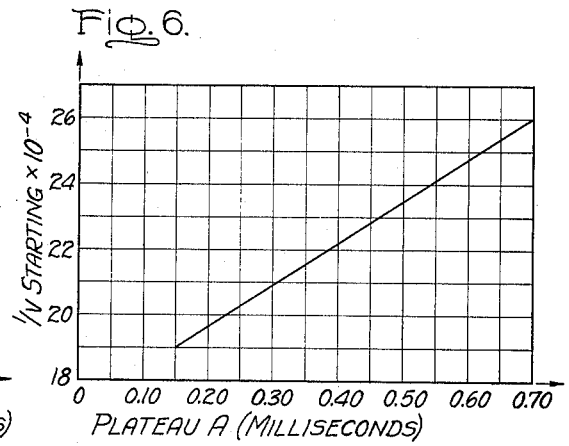
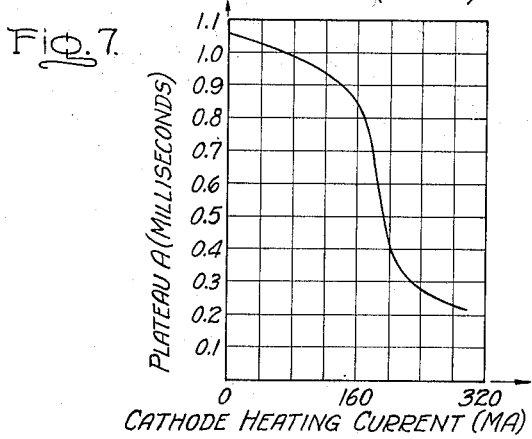
Inventors:
Dimitrios M. Speros
Peter R. Buccilli
by
Their Attorney Inventors:
Dimitrios M. Speros
Peter R. Buccilli
by *Ernest W. Hegner*
Their Attorney May 3, 1966 D. M. SPEROS ETAL 3,249,859
METHOD AND APPARATUS FOR MEASURING THE STARTING
CHARACTERISTICS OF GAS FILLED DISCHARGE LAMPS
Filed Sept. 25, 1961 3 Sheets-Sheet 3

Inventors:
Dimitrios M. Speros
Peter R. Buccilli
by Ernest W. Legner
Their Attorney

United States Patent Office

3,249,859
Patented May 3, 1966

3,249,859
METHOD AND APPARATUS FOR MEASURING THE STARTING CHARACTERISTICS OF GAS-FILLED DISCHARGE LAMPS
Dimitrios M. Speros, Painesville, and Peter R. Buccilli, South Euclid, Ohio, assignors to General Electric Company, a corporation of New York
Filed Sept. 25, 1961, Ser. No. 140,458
4 Claims. (Cl. 324—24)

This invention relates generally to electric discharge devices and lamps utilizing emissive cathodes in an ionizable medium, and more particularly to the determination of discharge device parameters by measuring the starting behavior of gas discharges therethrough.

The general object of our invention is to provide new and improved methods of measuring important discharge lamp or device parameters for the purpose of classifying lamps and sorting out unsatisfactory ones and also in order to improve control of variables during lamp manufacture.

More specific objects of the invention are to provide improved methods for ascertaining the degree of cathode activation and the effectiveness of gas filling or the accuracy of gas filling pressure during lamp manufacture.

Other objects of the invention are to provide improved devices making use of our measuring method for automatic, non-destructive monitoring of lamp quality during manufacture.

Our invention has resulted from oscilloscopic studies of gas discharges, with particular emphasis on fluorescent lamps, during the starting cycle, that is during the usually short interval of time beginning immediately upon the application of voltage and extending to the formation of the normal stable arc discharge. If, by means of a suitable circuit including a cathode ray oscilloscope, one obtains voltage versus time traces with respect to the discharge through the lamp when a relatively low over-voltage sufficient to ignite the lamp is applied, three distinct plateaus of varying time length or duration are observed. The first plateau, which we term plateau A, corresponds to a formative time lag for breakdown, sometimes known as emissive dead time. The second plateau, which we term plateau B, corresponds to a period of generalized emission from the cathode, also known as glow emission. The third plateau, which we term plateau C, is characterized by the constriction of the discharge at the cathode into a hot spot; plateau C is indefinite in duration, being the normal mode of operation of the lamp, and continues as long as the lamp is turned on.

We have established that these plateaus are quantitatively dependent on lamp parameters, as for example electrode gap, cathode activation and temperature, gas pressure and others. Observation and measurement of these plateaus permits one to obtain accurate information on the construction and processing of the lamp. Defective or imperfect lamps are readily identified by anomalies in time length of plateau A or voltage height of plateau B.

For further objects and advantages of the invention, attention is now directed to the following detailed description to be taken in conjunction with the accompanying drawings. The features of the invention believed to be novel will be more particularly pointed out in the appended claims.

In the drawings:

FIG. 1 is a schematic diagram of a circuit which may be used to obtain the traces exhibiting the various plateaus with which the invention is concerned.

FIGS. 2, 3 and 4 show respectively traces of voltage vs. time, current vs. time, and cathode light vs. time during the starting interval.

FIGS. 5, 6 and 7 show respectively the relationship between time length of plateau A and electrode distance, time length of plateau A and the magnitude of applied voltage, and time length of plateau A and cathode heating current.

Figure 8:
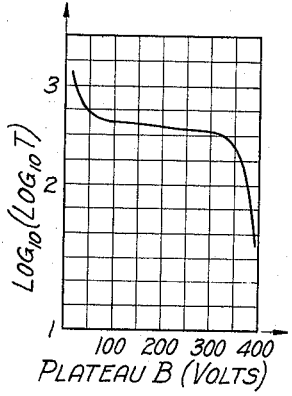
FIG. 8 shows the relationship between voltage height of plateau B and cathode temperature.

Our oscillographic studies of gas discharge were made using the circuit illustrated in FIG. 1. The lamp 1 is an ordinary fluorescent lamp consisting of an elongated tube with filamentary activated electrodes 2, 3 at opposite ends. The lamp has a filling forming an ionizable medium and consisting of an excess of mercury and an inert starting gas such an argon or a mixture of argon and neon at a pressure of a few millimeters of mercury. The lamp is connected across a regulated D.C. power supply 4 whose open circuit or terminal voltage is adjustable at will as indicated conventionally by the arrow 4'. A variable resistance or rheostat 5 connected in series with the lamp circuit limits the operating current through the lamp after it has ignited and is adjustable to accommodate various lamps. Since the tests were conducted using direct current, only one of the lamp electrodes, 2 in the illustration, operates as a cathode and is connected to a cathode heating transformer (not shown) at terminals 6; electrode 3 operates as an anode and does not require any heating current. A switch 7, which may be a mercury switch or alternatively a thyratron tube, determines the instant at which voltage is applied across the lamp. The voltage-time and current-time traces are observed on the cathode ray tube 8 of an oscilloscope 9 which may be of conventional design with D.C. input signal amplifiers. The voltage signal is supplied to the oscilloscope through leads 10, 11, and the current signal through leads 11, 12 which apply the voltage developed by the lamp current across a small series resistor 13. The internal sweep network within the oscilloscope is arranged to start the sweep or trace at the instant of closure of switch 7. Preferably the cathode ray tube 8 is provided with a long persistence phosphor to allow the trace to remain visible for an appreciable interval after a single sweep.

FIGS. 2 and 3 show respectively the voltage-time and current-time traces obtained on the oscilloscope in FIG. 1 with typical fluorescent lamps. FIG. 4 shows the cathode light output obtained over the same time interval; the trace of FIG. 4 was obtained by focusing the light generated in the immediate vicinity of cathode 2 on a photocell and applying the output of the photocell to the oscilloscope input terminals. Referring in particular to FIG. 2, the voltage-time trace shows 3 distinct plateaus or voltage levels which are denoted A, B and C and the corresponding levels in the current-time and cathode light-time traces are similarly indicated. We have determined that these plateaus are directly related to important lamp parameters whereby they can be utilized to control lamp quality.

PLATEAU A

Plateau A in the voltage trace is the open circuit voltage applied across the lamp before the current has built up to any appreciable value. The corresponding current and cathode light traces during this interval are substantially zero. Plateau A corresponds to a formative time lag for breakdown or ionization within the lamp. Thus it substantially disappears if a spark, that is a very high voltage, is used instead of relatively low over-voltage to start the lamps. Its length or time duration depends on a number of factors including the value of voltage initially applied, the inter-electrode gap, the type and temperature of cathode, type and pressure of fill gas, and finally on lamp surroundings. FIG. 5 shows the dependence of time length of plateau A on the electrode gap or inter-electrode distance for standard fluorescent lamps (T12) of various lengths corresponding to sizes ranging from 14 to 40 watts. FIG. 6 shows the relationship between time length of plateau A and the value of open circuit voltage initially applied plotted on a reciprocal basis. FIG. 7 shows the relationship between time length of plateau A and cathode heating current which is determinative of cathode temperature.

PLATEAU B

Plateau B corresponds to a period of generalized emission from the cathode. The terminal voltage drops whereas current and cathode light rise to intermediate values. This interval is sometimes referred to as the glow discharge interval wherein the voltage drop across the lamp is higher than normal whereas the current through it is less. The voltage height of plateau B is extremely dependent on the type of cathode and its condition, in particular its temperature and state of activation. FIG. 8 for instance shows the relationship between the voltage height of plateau B and cathode temperature T plotted on a log log basis.

PLATEAU C

The onset of plateau C is characterized by the constriction of the discharge at the cathode into a "hot spot." The lamp has now achieved its normal operating mode wherein its impedance is negative so that the value of current flowing through the lamp is determined by the external circuit. Plateau C will of course endure as long as the lamp is turned on and operative.

We have conducted tests and observed the starting behavior of large numbers of fluorescent lamps in which variations in gas atmosphere and cathode state were deliberately introduced. These studies have led us to the following conclusions regarding the effects of various parameters on the traces characteristic of starting behavior, in particular on the time length of plateau A and on the voltage height of plateau B.

The expression "relatively low overvoltage" in the specification herein and in the claims is intended to signify an overvoltage such as indicated in FIG. 2 which results in conveniently measurable values of formative time lag for breakdown (plateau A) and of voltage height corresponding to the period of generalized emission from the cathode (plateau B).

CATHODE ACTIVATION

Other factors being equal, the more active the cathode, the greater the number of electrons emitted; hence the lower will be plateau B in the voltage-time trace, and the higher will be plateau B in the current-time trace.

Figure 9:
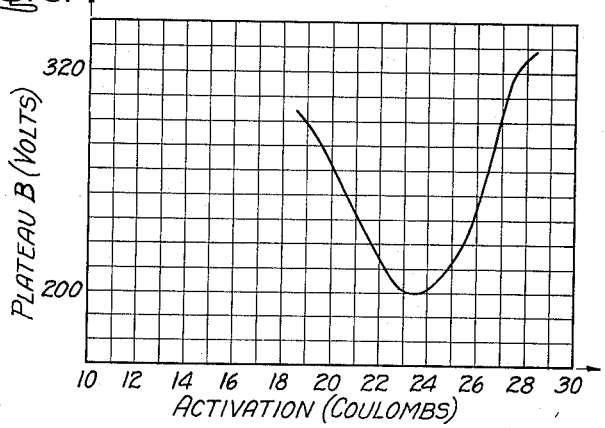
FIG. 9 shows the effect of activation schedule on the voltage height of plateau B.

FIG. 9 shows the dependence of the voltage height of plateau B on the activation schedule in typical 40-watt fluorescent lamps. Activation of the electrodes consists in breaking down the alkaline earth carbonate coatings to oxides by passing heating or discharge current through the cathode filaments. The degree of activation depends upon the current caused to flow through the filaments and the time duration of current flow at the successive index positions on the lamp sealing machine. The total activation will be the summation of the product of current by time at the various index positions and is conveniently expressed in coulombs. The desirable activation is of course that which gives the lowest voltage height in plateau B, such indicating the most active cathode. With underactivation (left of the minimum) or overactivation (right of the minimum) less active cathodes result. Re-examination of the same lamps after seasoning shows that the minimum moves towards the underactivated side which, from chemical considerations, is to be expected. It has also been determined that the efficiency and wattage of the lamps varies with the activation schedule according to a pattern corresponding in general to the variations in voltage height of plateau B illustrated in FIG. 9.

LAMP SEASONING

Whether a lamp has been seasoned and the extent of such seasoning will affect the voltage height of plateau B. In addition, unseasoned lamps tend to give an irregular plateau B of saw-tooth appearance, that is having irregular spikes and valleys, while seasoned lamps give a smooth plateau B.

It is well-known that "exhaust" cathodes tend to be poorer or less efficient cathodes than "dummy" cathodes. The "exhaust" cathode is that at the end of the lamp that has the tubulation used for pumping out the lamp during manufacture, whereas the "dummy" cathode is that at the opposite end without an exhaust tubulation. The poorer quality of the "exhaust" cathode is generally attributed to the fact that during activation it is immersed in a more contaminated atmosphere than the "dummy" cathode. This difference is reflected in the voltage heights of the plateaus B and in general "exhaust" cathodes have plateaus B of greater voltage height than "dummy" cathodes. By taking special precautions to activate "exhaust" and "dummy" cathode equally, the plateaus B can be made equal for both cases.

The voltage height of plateau B will also vary with the emission material used on the cathode; for example, the conventional triple oxide mix gives a different result than inter-oxides. It also varies with cathode geometry, for instance coiled-coil with overwound as against a simple coiled-coil.

LAMP SURROUNDINGS

Figure 10:
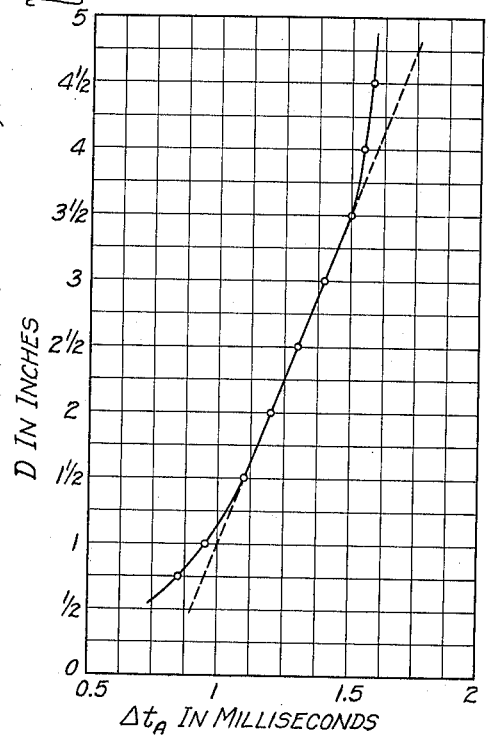
FIG. 10 shows the effect of lamp surroundings including starting aids or capacitive members on the time length of plateau A.

It is well-known that the ease of starting of discharge lamps is very dependent upon the proximity of conductive or capacitive members of various geometries, for instance starting strips or conductive plates such as a metal part of the fixture in the vicinity of the lamp. It is to be expected therefore that the time length of plateau A should reflect the influence of the surroundings. This is illustrated in FIG. 10 wherein the increment in time length of plateau A for 40-watt lamps, $\Delta t_A$ in milliseconds, is plotted against the distance of the lamp from a conductive member, D measured in inches. The conductive member used is a metal rod, one-half inch in diameter, arranged parallel to the lamp. The curve (solid) shows that when the lamp is sufficiently distant, the voltage height of plateau A, and therefore the starting of the lamp, are not influenced. At intermediate distances, a linear dependence (dotted line) is obtained, whereas at distances shorter than one inch the length or time-duration of plateau A varies exponentially with distance from rod to lamp. The voltage height of plateau B remains constant throughout and is not affected.

GAS FILL

In connection with the determination of the filling or gas atmosphere in a lamp, the voltage height of plateau B is not affected to any substantial extent by the time length of plateau A; however, the time length of plateau A is profoundly affected by the voltage height of plateau B. In general, the time length of plateau A increases as the voltage height of plateau B is increased. In a way this is to be expected inasmuch as a formative time lag involves a multiplicative process of the form:

$$N_t = N_0 \exp \cdot f(x,y,z)$$

where $U_0$ are the electrons available at 0 time, and $N_t$ are those existing at time $t$.

Figure 11:
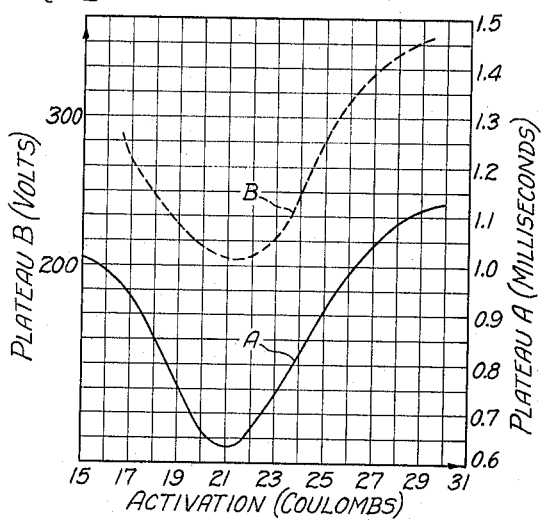
FIG. 11 shows the interdependence of time length of plateau A with voltage height of plateau B.

The change in time length of plateau A due solely to a change in voltage height of plateau B can of course be determined. The interrelationship is shown in the two curves of FIG. 11 wherein curve A (solid) represents the variation in time length of plateau A with cathode activation, and curve B the concurrent variation in voltage height of plateau B. In certain types of determinations, for instance in determining the gaseous atmosphere pressure in lamps differing both in pressure and cathode activation, it is necessary to correct for the change in time length of plateau A due solely to a change in voltage height of plateau B.

Figure 12:
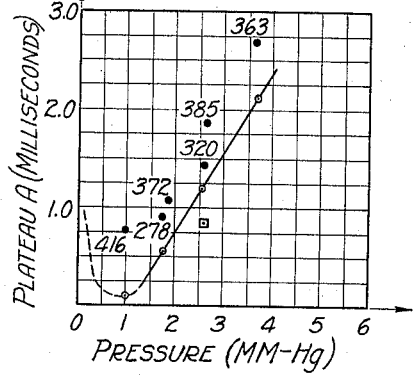
FIG. 12 shows the relationship between time length of plateau A and gas-fill pressure.

The effect of gas fill pressure on the time length of plateau A is illustrated in FIG. 12. Standard 40-watt fluorescent lamps were used but filled with argon to various pressures. The voltage-time and current-time traces were taken and then the lamp filling pressures were determined by conventional methods. Conventional methods generally involve connecting the lamp to a differential manometer and breaking the exhaust tip, and are of course destructive. In FIG. 12, the solid dots on the plot indicate the measured time length of plateau A for each of the lamps, uncorrected for cathode variation (i.e. plateau B variation) from lamp to lamp. The figures next to each dot give the voltage height of the plateau B determination for each lamp. After correction for plateau B voltage height variation by means of the interrelationship shown in FIG. 11 and wherein all plateau A time lengths are referred to a common 200-volt voltage height for plateau B, the results are shown by the circled dots on the plot through which the curve is drawn. A Paschen-like curve is obtained, the higher pressures falling on an approximately straight line and a minimum occurring at about one millimeter pressure. One may conclude from the foregoing that the time lengths of plateaus A for lamps having similarly activated cathodes will necessitate no correction. Also it is seen that with correction applied for variations in cathode activation, the filling gas pressure can be determined within a tenth of a millimeter or so of mercury. Thus a nondestructive method of determining gas filling pressure is provided.

The time length of plateau A is also affected by the filling gas composition. Thus the dot surrounded by a square on the plot of FIG. 12 shows the time length of plateau A for a 40-watt fluorescent lamp having a filling gas mixture of 30% neon and 70% argon at a pressure of 2.5 mm. It will be observed that the value is different from that of the lamp having a filling of argon at 2.5 mm. and indicated by the circled dot.

The time length of plateau A is also affected to some extent by the type of phosphor coating applied to the lamp wall.

In accordance with our invention, we make use of the foregoing findings both for controlling lamp variables during manufacture and for sorting out defective lamps after manufacture. This is made possible by reason of the fact that by the simple measurement of the time length of plateau A and the voltage height of plateau B, it can be determined whether a given lamp falls within desirable manufacturing specifications. Since the time duration of plateaus A and B is of the order of a few milliseconds only, the method is adaptable to high lamp productions rates.

LAMP MONITORING

Specific instrumentation for production line use may take the form of the test equipment previously described with reference to FIG. 1. The equipment may be placed in the last position of the lamp making assembly line. Whether or not a lamp meets specifications may be determined by visual observation of the oscilloscope traces. However, lamp monitoring procedure may readily be automated by masking appropriate portions of the screen or face of the cathode ray tube with an opaque material. More conveniently, to permit ready interchangeability of masks for different types of lamps, a mask 15, indicated by the cross-hatched area, may be applied to a glass disk 16 shown in FIG. 13, for mounting before the face of the cathode ray tube. The mask is cut and placed so as to cover all traces resulting from variations in time length of plateau A or in voltage height of plateau B within predetermined acceptable tolerance limits for the type of lamp under test. As illustrated, permissible variation in time-length of plateau A is from $t_0$–$t_1$ to $t_0$–$t_2$; permissible variation in voltage-height of plateau B is from $V_1$ to $V_2$. By way of typical example applicable to a 40-watt fluorescent lamp, time length of plateau A may be set at 1.1 ±0.1 millisecond, and voltage height of plateau B at 215 ±15 volts. If lamp under test should produce a trace which is outside the limits of the mask on either count, the trace will no longer be hidden and will readily be seen on the face of the cathode ray tube.

The test voltage applied is preferably D.C. However since the total duration of the test is but a few milliseconds and therefore much shorter than a 60 cycle A.C. half cycle, it is also possible to use A.C. provided suitable means are used to start all tests at the same point or phase angle in the A.C. cycle.

Figure 14:
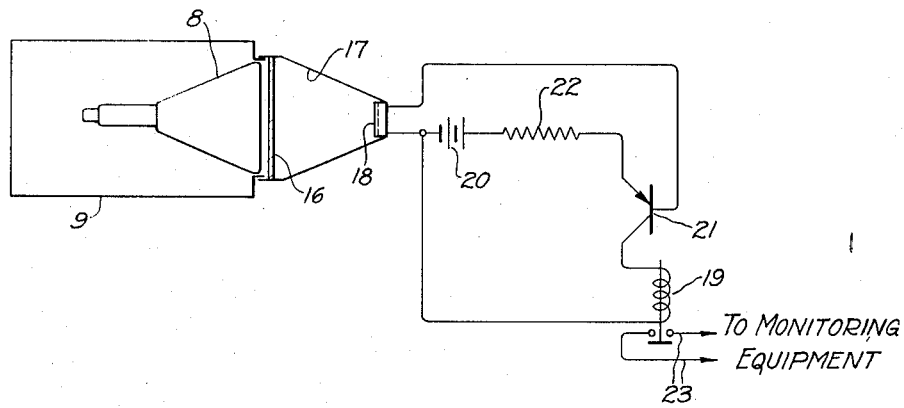
FIG. 14 illustrates schematically a monitoring system utilizing a masked oscilloscope screen for practicing the method of the invention.

The equipment may be further automated as indicated in FIG. 14 wherein the glass disk 16 bearing mask 15 is placed in front of cathode ray tube 8 and is surrounded by a conical light shield 17. The interior of the light shield is painted matte black and a photoconductive cell 18 is mounted at its apex facing the cathode ray tube. A relay 19 has its operating coil connected across a battery 20 in series with the emitter-collector path of a transistor 21 and a biasing resistor 22. The photocell is connected between base and collector of the transistor. If the trace of the cathode ray tube falls outside the masked area, the photocell is illuminated and its conductance increases. This biases the base of the transistor in the potential direction of the collector, thereby turning it on and energizing relay 19. The relay contacts close the circuit of conductors 23 which control suitable monitoring equipment, such as a warning bell or lamp marking or ejecting devices.

Figure 15:
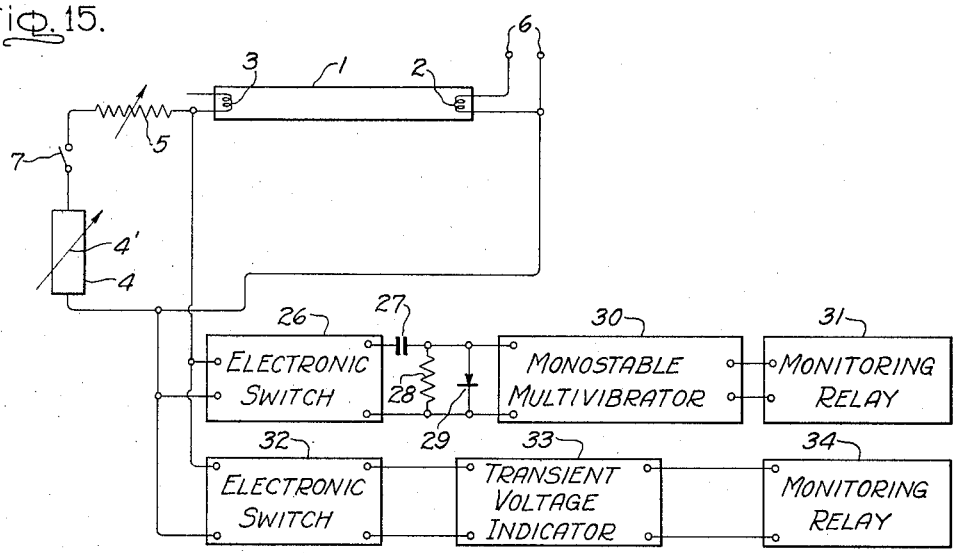
FIG. 15 illustrates schematically an alternative monitoring system.

Instead of the monitoring equipment illustrated in FIG. 14 utilizing a rather expensive oscilloscope, for factory use simpler circuits may be devised not using an oscilloscope. One such is illustrated in FIG. 15. The lamp 1 under test is connected in essentially the same circuit as has been previously described with reference to FIG. 1 comprising an adjustable D.C. voltage supply 4 having a current limiting resistor 5 and switch 7. The function of the test equipment is to indicate lamps falling outside the predetermined limits in regard to time length of plateau A and voltage height of plateau B.

Figure 13:
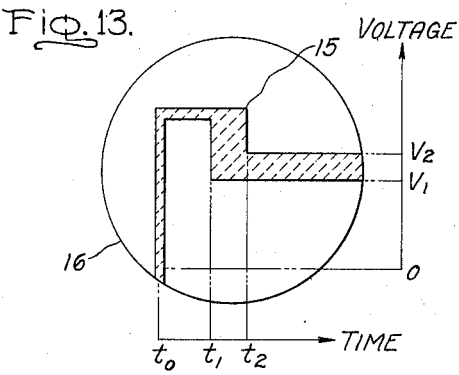
FIG. 13 shows a masking screen for use with an oscilloscope in lamp monitoring.

The test circuit in regard to plateau B measurement comprises an electronic switch 26 which is arranged to close, that is to transmit a signal applied to its input terminals, during the time interval $t_1$ to $t_2$ (refer to FIG. 13). If plateau A terminates during the interval, a negative step voltage will be transmitted through the electronic switch, the step corresponding to the drop from plateau A to plateau B. Capacitor 27 and resistor 28 constitute a differentiating network and diode 29 is connected to bypass to ground any positive pulse. Therefore if the electronic switch transmits a negative step, the differentiating network and diode will translate the step as a negative pulse to monostable multivibrator 30. The multivibrator is upset by the pulse and causes monitoring relay 31 to close for a given period determned by the time constants of the multivibrator.

The test circuit in regards to plateau B comprises an electronic switch 32 which is arranged to close, that is to transmit a signal, after time $t_2$ (refer to FIG. 13). The electronic switch supplies its output signal to a transient voltage indicator 33 which accordingly responds to the plateau B voltage. The transient voltage indicator responds when the voltage signal supplied to it is within the limits of $V_1$ to $V_2$ and actuates monitoring relay 34. It will be appreciated that in the circuit of FIG. 15, the monitoring relays 31 and 34 are energized when the plateau A time length and plateau B voltage height indicates that the lamp is good. However it is a simple matter to modify the relays so that they will normally close only when the lamp is defective.

QUALITY CONTROL

Our method may also be used for automatic quality control during manufacture by adjusting some manufacturing parameters which are relatively easy to control in order to compensate for unavoidable variations in others. Manufacturing parameters which are difficult to control are for instance the weight of emission mix on the cathode, the geometric and contact characteristics of the cathode filament and the contact resistance between the lamp lead-in wires and the machine contacts. By means of a control procedure making use of the findings of our invention, it is possible to compensate in large part for such variations by adjusting the degree or coulombs of activation to suit. The plateau B voltage $V_B$ is measured on the sealing machine at one of the intermediate index positions of the activation schedule. If the measured $V_B$ is below the predetermined limits, a relay is activated which reduces the activating current in the subsequent activation positions to a low value, for instance 0.1 ampere instead of the standard 0.3 ampere activating current. This will prevent overactivation of the lamp. However if the measured $V_B$ is above the predetermined limit, then another relay is energized and the activating current is increased at the subsequent stations.

The following table is indicative of an activation control scheme which may be used in conjunction with a lamp sealing machine at the last three index positions of the activation schedule. The table is computed for a desired plateau B voltage height $V_B$ of 160 volts. The scheme involves the use of four relays which, upon energization, provide activating currents through the lamp cathodes as follows:

|         | Amps. |
|---------|-------|
| Relay A | 0.11  |
| Relay B | 0.22  |
| Relay $C_1$ | 0.44 |
| Relay $C_2$ | 0.44 |

*Table I*

| $V_B$ in Volts Read by the Device | Additional Coulombs Necessary for Proper Activation | Approx. Ampere Value that Must be Supplied to Each of Three Index Positions | Relay on— |
|---|---|---|---|
| 270–250 | 10 | 1.13 | $A+C_1+C_2$ |
| 250–230 | 6 | 0.66 | $A+C_1$ |
| 230–210 | 4 | 0.44 | $A+B$ |
| 210–180 | 3 | 0.33 | B |
| 180–160 | 2 | 0.22 | A |
| Below 160 | 1 | 0.11 | None |

GAS FILLING

Our invention may also be used to control gas filling during lamp manufacture. The exact volume of a lamp envelope is of course a manufacturing parameter which is very difficult to control. Where a constant volume or charge of gas is released into the lamps, variations in envelope volume will result in variations in gas fill pressure. It is therefore necessary to vary the charge in accordance with the volume of the lamp envelope. This may be done in accordance with our invention by measuring the time length of plateau A, $\Delta t_A$, by pulsing the lamp while it is being gas filled, that is by frequent rapid determinations of the plateau A time length. By using a control system similar to that which has been described above and involving the operation of one or more relays when $\Delta t_A$ is smaller than the predetermined value, the relay is arranged to maintain the solenoid gas filling valve open. The test is repeated at each gas fill position until the measured time length of $\Delta t_A$ reaches the desired value. At this point the relay allows the solenoid valve to close and gas fill is complete. Thus the invention permits gas filling with compensation for variations in lamp volume.

While certain specific applications of the various method of the invention and equipment suitable for same have been illustrated and described in detail, these are intended by way of example only. Modifications and other applications will readily occur to those skilled in the art and it is intended by the appended claims to cover any such as fall within the true spirit and scope of the invention.

What we claim as new and desire to secure by Letters Patent of the United States is:

1. The method of eliminating defective lamps in manufacture of fluorescent lamps of the kind wherein ignition proceeds through the stage of a formative time lag to an intermediate stage of generalized emission corresponding to glow discharge and thence to a final stage of arc discharge, which comprises applying cathode heating current at least to the electrode serving as cathode, connecting the lamp across a circuit providing a predetermined relatively low overvoltage sufficient to ignite the lamp and including current limiting means, measuring the time length (plateau A) corresponding to the formative time lag for breakdown, measuring the voltage height (plateau B) corresponding to the period of generalized emission from the cathode, and rejecting the lamp if either of said measurements falls outside of the predetermined limits for lamps of the same type.

2. The method of regulating cathode activation in fluorescent lamp manufacture which comprises applying cathode heating current at least to the electrode serving as cathode, connecting the lamp across a circuit providing a predetermined relatively low overvoltage sufficient to ignite the lamp and including current limiting means at an intermediate stage in the cathode activation schedule, measuring the voltage height (plateau B) corresponding to the period of generalized emission from the cathode, comparing the measured voltage height with acceptable predetermined limits for said lamp at said intermediate stage of activation, and increasing the coulombs of cathode activation supplied at a subsequent stage when the measured voltage height falls above the predetermined limits while decreasing the coulombs when the measured voltage height falls below the predetermined limits.

3. The method of regulating gas fill in fluorescent lamp manufacture which comprises applying cathode heating current at least to the electrode serving as cathode, connecting the lamp across a circuit providing a predetermined relatively low overvoltage sufficient to ignite the lamp and including current limiting means at an intermediate stage in the gas filling schedule, measuring the time length (plateau A) corresponding to the formative time lag for breakdown, comparing the measured time length with acceptable predetermined time length limits for said lamp at said stage of gas filling, and supplying additional gas to the lamp at subsequent gas filling stages to the extent that the measured time length falls below said predetermined limits.

4. Apparatus for measuring discharge lamp parameters comprising a voltage source providing a predetermined adjustable open circuit voltage, a switch, a current limiting impedance and terminals for connecting a discharge lamp in series across said source, means responsive to the time length (plateau A) corresponding to the formative time lag for breakdown when said switch is closed, means responsive to the voltage height (plateau B) corresponding to the period of generalized emission from the cathode following said formative time lag, and monitoring means actuated by said responsive means when said time length or said voltage height is outside predetermined limits.

References Cited by the Examiner

UNITED STATES PATENTS

| 2,668,943 | 2/1954 | Wilson | 324—158 |
| 2,733,358 | 1/1956 | Carapellotti | 324—121 X |
| 2,983,864 | 5/1961 | Gibson | 324—24 X |

WALTER L. CARLSON, *Primary Examiner.*

G. S. KINDNESS, E. L. STOLARUN,
*Assistant Examiners.*